United States Patent [19]
deMuro et al.

[11] Patent Number: 5,596,567
[45] Date of Patent: Jan. 21, 1997

[54] WIRELESS BATTERY CHARGING SYSTEM

[75] Inventors: David M. deMuro, Snellville; Vernon Meadows, Lilburn, both of Ga.

[73] Assignee: Motorola, Inc., Schaumburg, Ill.

[21] Appl. No.: 414,452

[22] Filed: Mar. 31, 1995

[51] Int. Cl.$^6$ ............................................. H01M 10/48
[52] U.S. Cl. ................................. 320/5; 320/48; 429/90
[58] Field of Search ........................ 320/2, 5, 30, 39, 320/48, 51; 429/7, 90, 92; 340/635

[56] References Cited

U.S. PATENT DOCUMENTS

| | | | |
|---|---|---|---|
| 4,387,334 | 6/1983 | Loper | 320/44 |
| 4,737,702 | 4/1988 | Koenck | 320/40 |
| 4,849,682 | 7/1989 | Bauer et al. | 320/15 |
| 4,885,523 | 12/1989 | Koenck | 320/21 |
| 4,965,738 | 11/1990 | Bauer et al. | 364/483 |
| 5,206,097 | 4/1993 | Burns et al. | 320/48 X |
| 5,298,346 | 3/1994 | Gyenes | 429/90 |
| 5,381,137 | 1/1995 | Ghnem et al. | 340/572 |

*Primary Examiner*—Edward H. Tso
*Attorney, Agent, or Firm*—Kenneth M. Massaroni

[57] ABSTRACT

A battery charger (12) and battery pack (14) are each provided with a wireless communications device, (24) and (28) respectively, to communicate over a wireless channel (32). The battery charger (12) receives charging information from a memory (30) housed in the battery pack (14), and commences a recharge process in accordance with the received information when the battery pack (14) is electrically coupled to the charger (12). The charger may update the information contained in the battery's memory (30) during the recharge process.

15 Claims, 5 Drawing Sheets

WIRELESS BATTERY CHARGING SYSTEM

Technical Field

This invention relates in general to charging systems for rechargeable batteries and battery packs and in particular to charging systems in which the rechargeable batteries have a memory device for storing recharge process information.

Background

Advances in electrochemistry have given users of portable electronic systems a wide range of choice for power sources. Examples of such power sources include batteries, capacitors, and hybrid battery/capacitor systems. As a result, manufacturers of portable electronic devices, for example, cellular phones, offer several styles of batteries for the same device. A typical battery family for a cellular phone includes three chemical systems, each system offering 2 or 3 capacities. Each of these batteries has different charging requirements. Accordingly a battery charger designed for a given battery family has to be quite sophisticated.

Manufacturers have realized that chargers can be made less sophisticated, and therefore less expensive, if the battery provides some indication of how it should be recharged. A simple means to give such an indication is to provide the battery with a memory device. The memory device contains charge instructions and possibly other recharge related data. When the battery is coupled to the charger, the charger retrieves the information and charges the battery accordingly. In some cases, this information is also made available to the host device so that it can accurately determine the amount of operation time remaining, which is then indicated to the user.

The information is communicated by means of an electrical conductor, or contact, provided in addition to the charging contacts. The cost of this additional contact obviously impacts the battery, but also the charger since it needs a matching contact. In many cases, the host device will require a matching contact as well. At the same time, additional steps must be taken to protect the memory device from static electricity discharge events, or electro-static discharge (ESD). Some memory devices have a measure of ESD protection already provided, but it is typically not enough to handle the levels encountered with portable electronics. Regardless, if the memory has partial or full ESD protection, there is an additional associated cost.

Therefore there is a need to provide a battery with a means of directing a charger with regard to the best way to charge the battery. Further, there is a need to provide such means without incurring the cost and associated ESD protection required by using additional contacts throughout the battery/charger/ device system. Ideally, such additional contacts should be eliminated if possible.

Detailed Description of the Preferred Embodiment

Figure 1:
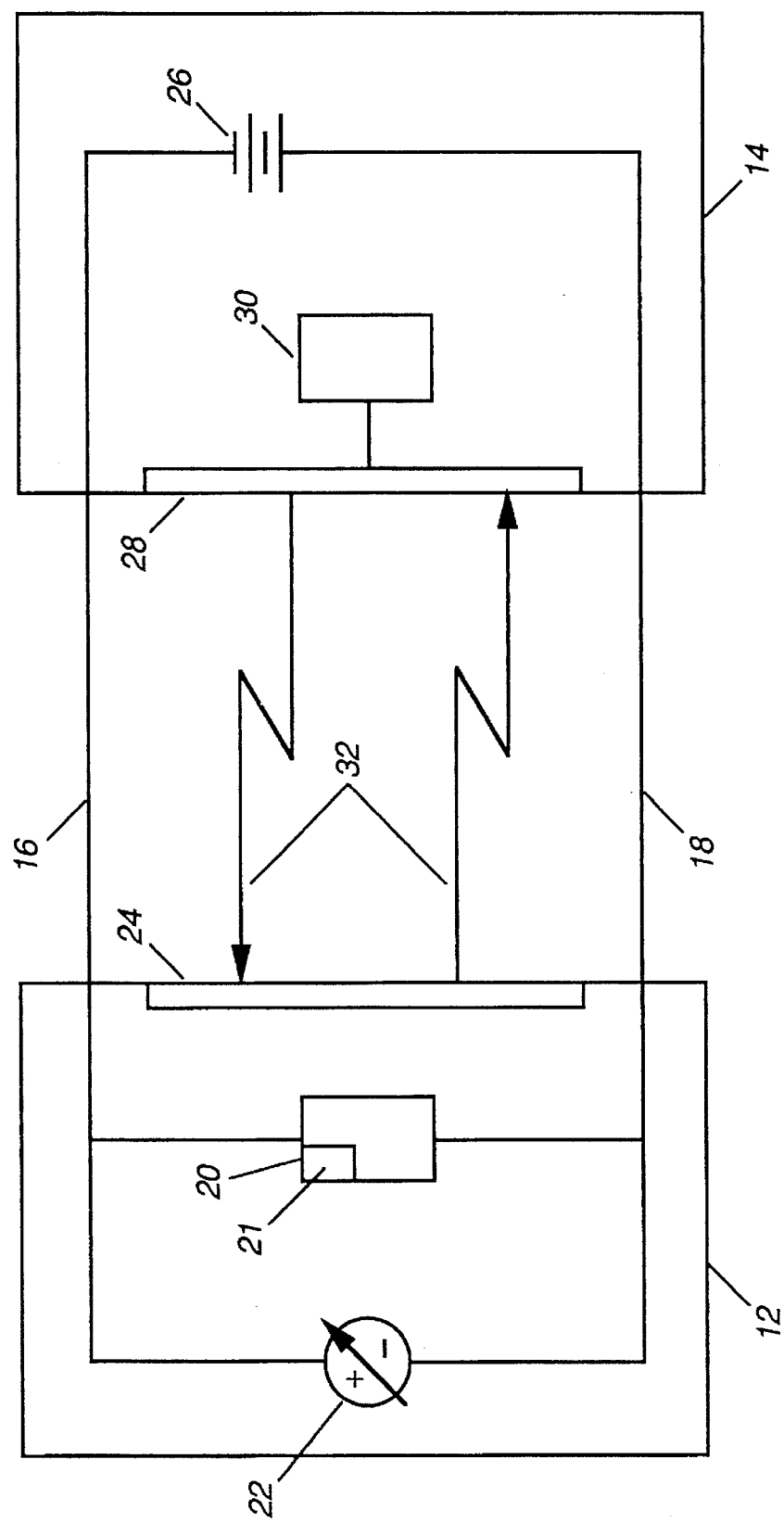
FIG. 1 is a block diagram representation of a battery pack and battery charger having a wireless communications means in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is shown a battery charging system 10 in accordance with the invention. A battery charging device such as a battery charger 12 couples to a rechargeable battery pack 14 through a positive line 16 and a negative line 18, each of which may include charging contacts. The charger 12 is provided with a controller 20, a variable power source 22 responsive to the controller 20, and a wireless charger communication module 24 for providing information to the controller 20 received from the battery pack 14 in a manner described below. The controller is preferably a microprocessor, such as a Motorola 68HC05 microprocessor, having a control algorithm memory space 21. The battery pack 14 includes at least one battery cell 26, a wireless battery communication means such as wireless battery communication module 28, and memory device 30 for storing information relating to charging said at least one battery cell. The charger and battery pack communicate over a wireless channel 32, which is effective only over a small distance i.e., less than about 50 cm.

While the battery charger 12 is idle, (i.e., is not charging a battery) the wireless charger communications module continuously interrogates the wireless channel 32 to determine if a battery pack 14 is proximally located. When the battery pack 14 is brought near the battery charger 12, a link is established over the wireless channel 32, and the battery charger 12 receives charging information from the memory device 30. Shortly after, or during the time the battery charger 12 receives the battery pack information, the battery pack is coupled to the charger by the positive and negative lines 16 and 18 respectively. Once the battery pack is engaged in the charger, the battery charger 12 commences a recharge process in accordance with the information received from the memory device 30.

The information stored in the memory device 30 is preferably charging procedures or instructions such as the precise charging algorithm which the charger will require in order to charge the particular battery. The stored information may also be, or include other information or parameters such as manufacturing data or number of recharge cycles to date; numerous other types of data relevant to the battery pack may also be stored. The battery charger 12 receives the charging procedures and/or the stored parameters and loads them into key locations in its control algorithm memory space 21. As the battery pack 14 is recharged, and the algorithm is processed, the controller encounters the loaded instructions at critical times. As a result, the at least one battery cell 26 receives an optimum charge regime.

Figure 2:
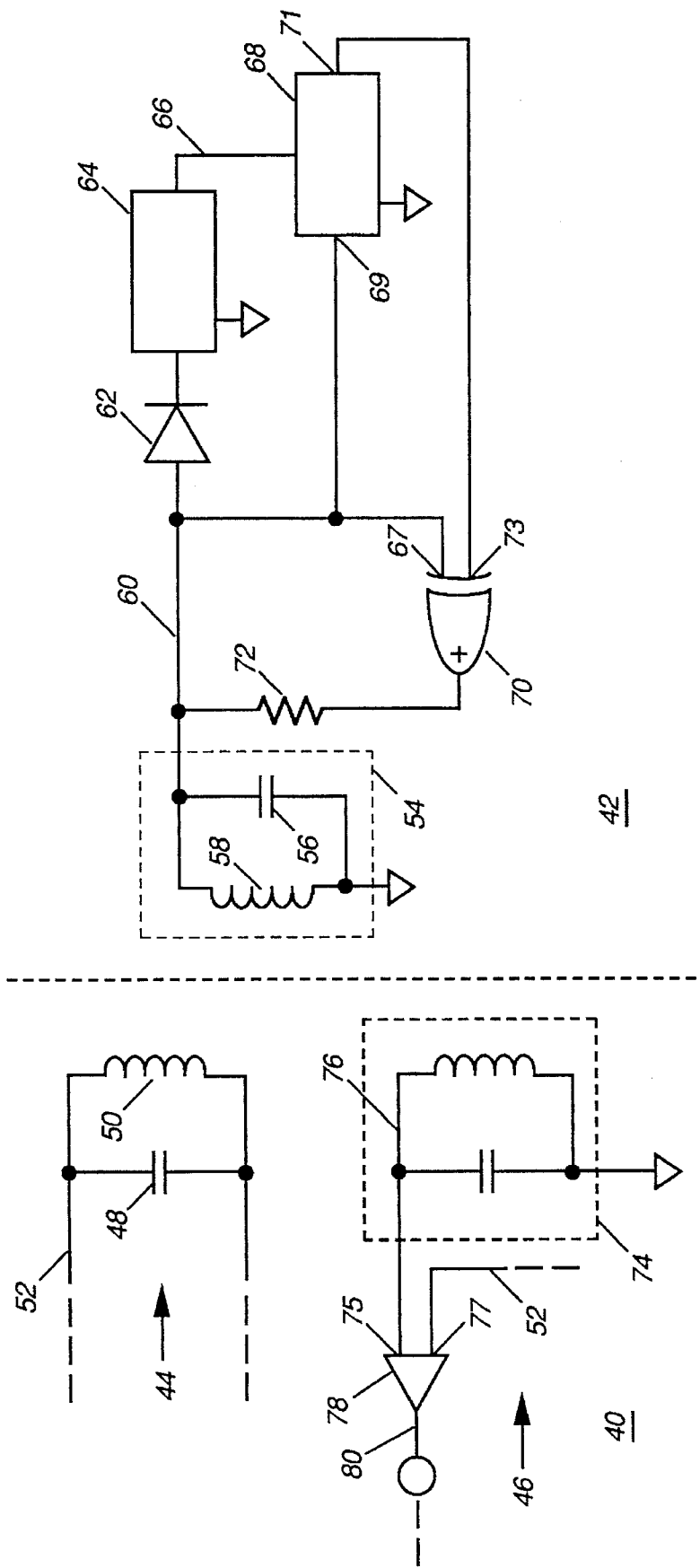
FIG. 2 is a circuit diagram of a circuit for providing one-way wireless information transfer from a battery pack to a battery charger, in accordance with the invention.

Referring now to FIG. 2, where there is shown a circuit diagram of one preferred circuit for providing a one way wireless information transfer from the battery pack 14 of FIG. 1 to the battery charger 12 of FIG. 1 in accordance with the invention. A charger circuit 40 is shown with a corresponding battery circuit 42. The charger circuit 40 includes an excitation circuit 44 and a reader circuit 46. The excitation circuit 44 is a tank circuit comprised of a capacitor 48 and a charger excitation coil 50 coupled in parallel. The excitation circuit has a fundamental frequency at which it resonates when excited. An oscillator (not shown) provides an excitation signal on line 52 to the excitation circuit to excite it, causing a resonance to occur. As a result, the charger excitation coil 50 has an alternating magnetic flux. The coil is positioned in the charger so that its magnetic flux is evident from outside of the charger, and thus provides a magnetic flux signal in the wireless channel 32 shown in FIG. 1.

The battery circuit 42 has a corresponding tank circuit 54 comprising a capacitor 56 and a coil 58 coupled in parallel. These components, however, may have different values front their counterparts in the charger excitation circuit 44. When the coil 58 encounters the magnetic flux signal of the charger excitation coil 50, such as when the battery pack is inserted into the charger for recharging, it is magnetically coupled into the charger circuit, 40, thereby shifting the resonant frequency of the excitation circuit 44. The battery charger, however, continues to drive the excitation circuit 44 at the same frequency. The battery tank circuit 54 is stimulated by the magnetic flux signal produced by the charger excitation coil 50, which resonates sympathetically, thus providing a sinusoidal signal on line 60. This sinusoidal signal is fed to a rectifier 62, and the resulting rectified signal is fed to a regulator circuit 64. The regulator circuit 64 stores energy from the rectified signal capacitively and produces a regulated DC voltage on line 66. This DC voltage is used to power components such as memory device 68, corresponding to memory 30 of FIG. 1, and an exclusive OR logic gate 70.

The memory device 68 has a clock input 69, which receives the signal from line 60, and a data output 71. The memory device 68 has an internal logic circuit that, when the memory device is powered up, begins sequentially writing its memory contents to the data output 71 and synchronized to the clock input 69. Once all the data has been signaled, data transfer starts again and continues sending the data non-stop in a cyclical fashion until the memory device loses power. The data output 71 is connected to one input 73 of the logic gate 70 and is compared to the signal of line 60 as an exclusive OR function. The signal for line 60 is fed to the logic gate 70 via input 67. Whenever the data output and the clock signal are the same, i.e., high or low, the output of the logic ate becomes a low impedance. As a result, resistor 72 gets switched in and out of parallel with the tank circuit 54 in response to data sent by the memory device. This causes a phase shift in the signal since it is slightly off of the resonant frequency as a result of the loading effect the battery circuit 42 has on the charger excitation circuit 44. In this sense, the logic gate and resistor constitute a phase shift device. The phase shift is reflected in the magnetic flux signal between the battery and charger, which results in a communications protocol known as bit phase shift keying (BPSK), and is used in applications such as security card systems.

In order for the battery charger 12 to receive the data stored in the battery pack memory, the reader circuit 46 is also provided with a tank circuit 74 (i.e., a capacitor and coil in parallel) having the same resonant frequency as the tank circuits comprising excitation circuit 44, and battery tank circuit 54. Tank circuit 74 picks up the reflected magnetic flux signal produced by the battery as it sends information, and reproduces it on line 76, which is fed to one input 75 of a phase shift detector 78. The phase shift detector 78 comprises a comparator and compares the reflected signal on line 76 with the excitation signal from line 52 which is fed to a serial input 77 of the phase shift detector 78. The phase shift detector 78 produces a digital output on line 80 triggered by phase differences between the reflected signal 76 and the excitation signal 52. This digital signal is fed to the controller 20, shown in FIG. 1, which loads the information accordingly. The circuits described in FIG. 2, and their operation, are more fully described in U.S. Pat. No. 5,381,137, the disclosure of which is incorporated herein by reference.

Figure 3:
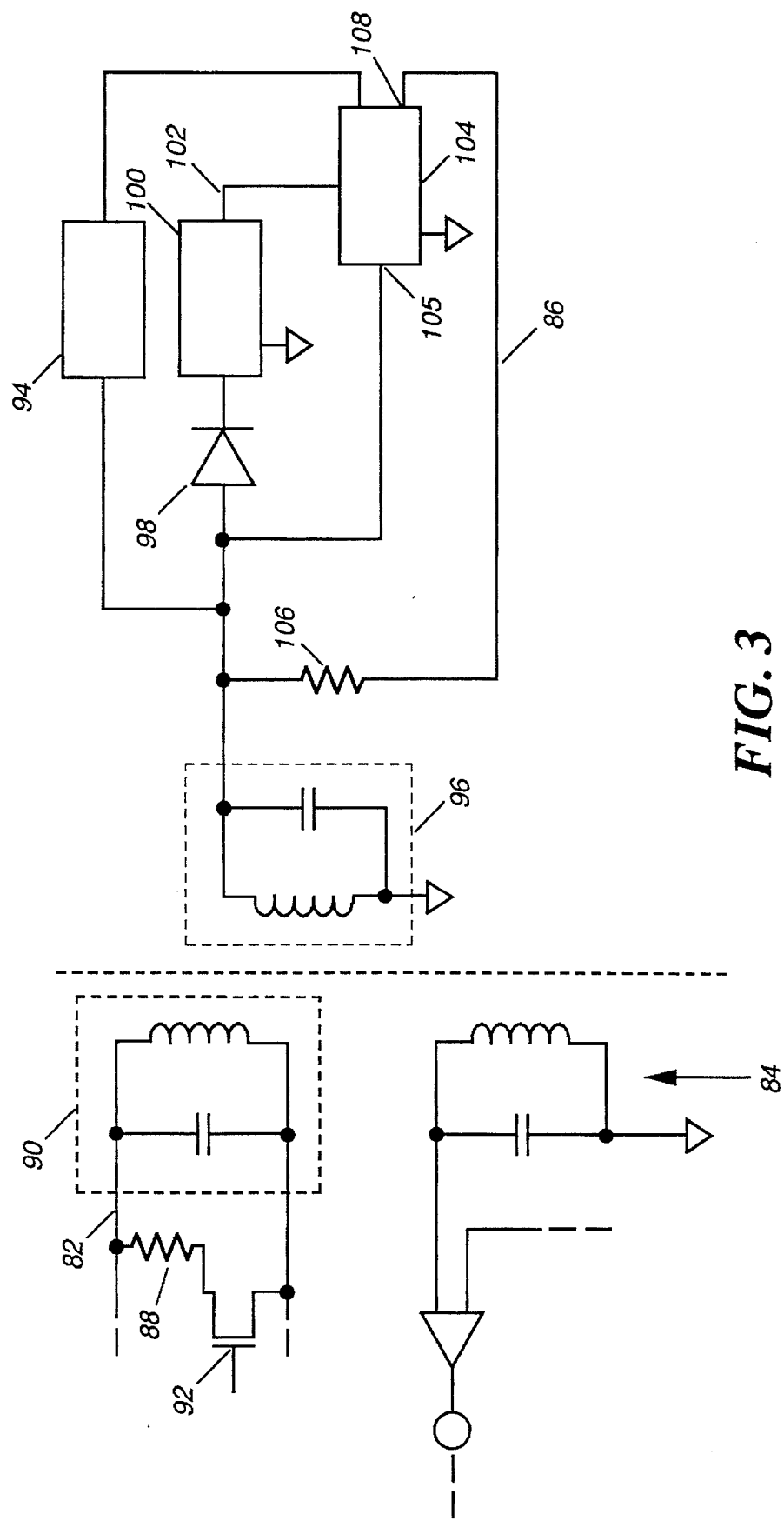
FIG. 3 is a circuit diagram of a circuit for providing two-way wireless communication between a battery, and a battery charger, in accordance with the invention.

Referring now to FIG. 3, there is illustrated therein a circuit diagram of a circuit for providing two-way wireless communication between a battery and a battery charger where information can be both transmitted to, and received from a charger by a battery, in accordance with the invention. The circuit is similar to that of FIG. 2; there is an excitation circuit 82, a reader circuit 84, and a battery circuit 86. The reader circuit 84 is identical to the reader circuit 46 shown in FIG. 2. However, the excitation circuit 44 and battery circuit 42 have been modified to allow the charger to send information to the battery.

The excitation circuit 82 now includes a resistor 88 coupled to the tank circuit 90 described in FIG. 2. When the battery charger sends data as from memory, it switches the resistor 88 in parallel with the tank circuit 90 via transistor 92 according to the logic level of the particular bit being communicated. The charger excites the tank circuit 90, as before, and switches the resistor 88 in parallel with it to cause a phase shift in response to the data being sent. This is similar to how the battery circuit 42 of FIG. 2 communicates with the charger.

However here, the battery circuit 86 does not have access to the signal fed to the excitation circuit 82, and thus cannot make the same simple phase comparison. Instead, the battery circuit 86 uses a phase shift detector 94 such as a phase lock loop circuit to measure phase error. The battery circuit 86 has a tank circuit 96 as in FIG. 2 which is stimulated when the magnetic field signal produced by excitation circuit 82 is applied. A rectifier 98 rectifies the signal produced by the tank circuit 96 and powers a regulator 100. The regulator 100 produces a DC voltage on line 102, which powers a microprocessor 104. The microprocessor 104 is fed the signal produced by the tank circuit 96 via input 105 to provide a clock signal.

As the excitation circuit 82 changes phase in response to data being sent, the phase shift detector 94 signals the microprocessor. The microprocessor processes the information and takes whatever action is requested. The microprocessor preferably has a portion of non-volatile memory, such as an EEPROM, which holds information which may change over the life of the battery. By non-volatile it is meant that the information in the memory may be changed, and that the information is retained when power is removed from the memory. Examples of information which may be stored in the non-volatile memory may include, but is not limited to, cycle count, input capacity, and age. When it is time for the battery to send information to the charger, the microprocessor switches a resistor 106 alternately in and out of parallel with the tank circuit 96 by means of an output 108 to produce the desired phase shift, as shown and described in FIG. 2, to achieve magnetically coupled BPSK protocol signal communication. The reader circuit 84 reads the signal and produces a digital output, as described in FIG. 2.

Figure 5:
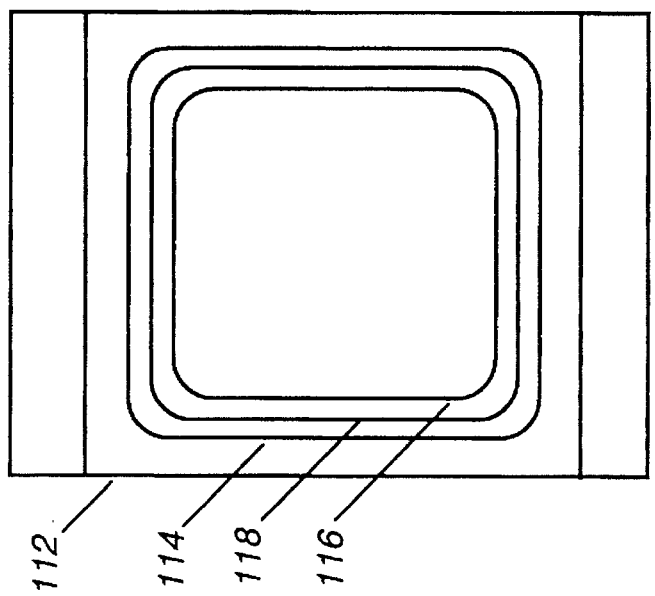
FIG. 5 is a top view of a battery pack including the coil of FIG. 4.
Figure 4:
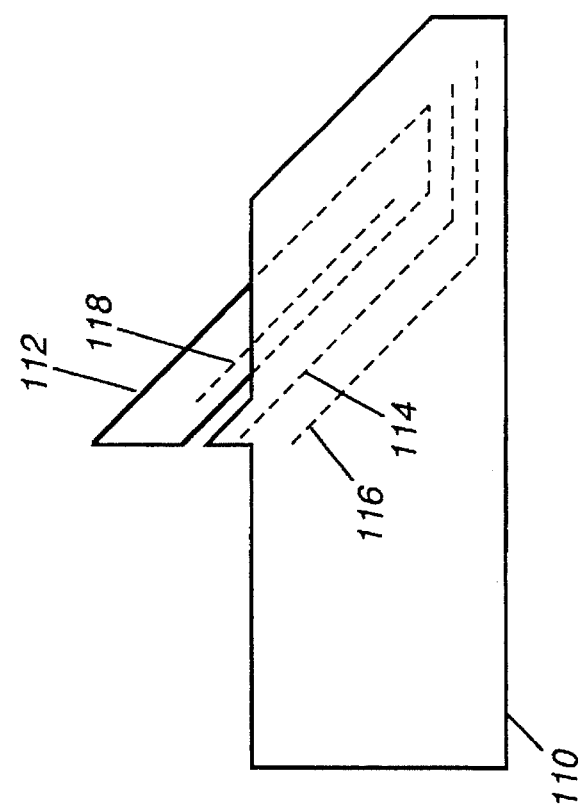
FIG. 4 is a side view of a first alternative embodiment of a coil arrangement in a battery pack and a battery charger in accordance with the invention.

Referring now to FIGS. 4 & 5, where there is shown a first alternative embodiment of a coil arrangement in accordance with the invention. FIG. 4 is a side view of a battery charger 110 and a battery pack 112 inserted in the battery charger 110. FIG. 5 is a top view of battery pack 112 identified with corresponding reference numerals. The battery charger 110 has an excitation coil 114 and a reader coil 116 (in phantom), and the battery pack has a battery coil 118 (in phantom) imbedded therein. The coils, 114 and 116, are made from several loops of wire in a substantially coaxial and coplanar arrangement, and are mounted in the battery charger 110 and battery pack 112 on adjacent surfaces. This arrangement allows the coils 114 and 116 of the charger and the battery coil 118 to be strongly coupled when the magnetic flux is produced during communication.

Figure 6:
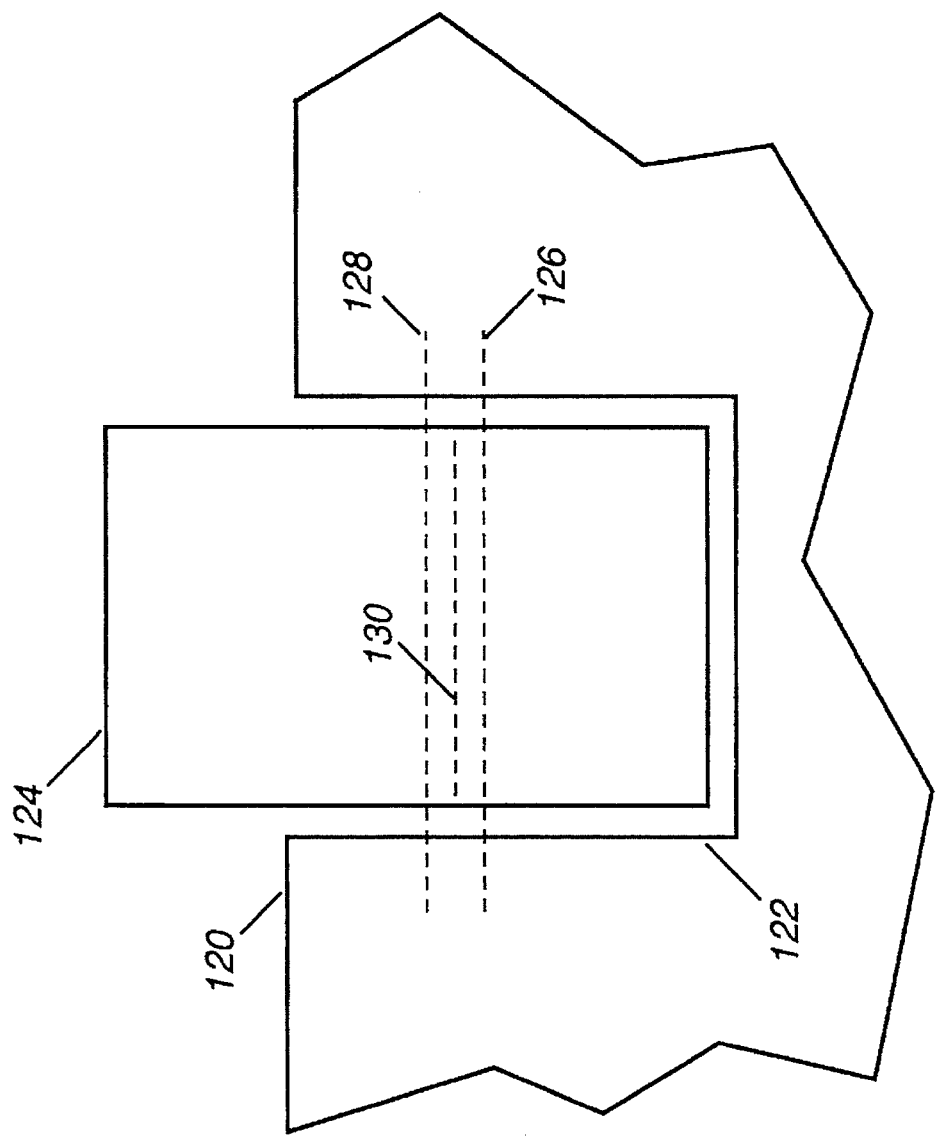
FIG. 6 is a second alternative embodiment of a coil arrangement in accordance with the invention.

Referring now to FIG. 6, where there is shown a second alternative embodiment of a coil arrangement in accordance with the invention. FIG. 6 is a cross-sectional side view of a second battery charger 120, having a battery pocket 122. A battery 124 is inserted into the battery pocket 122. The battery charger 120 has an excitation coil 126 and a reader coil 128, and the battery has a battery coil 130. Although shown here with the excitation coil and readers coil located above and below the battery coil, it is contemplated that coils 126 and 128 may be in reverse order, co-located, and positioned above and below each other. It is only important that they encircle substantially the same area as the battery coil at substantially the same position.

From it should be appreciated that the memory device in the battery is completely protected from ESD since the circuit is totally insulated electrically. As a result, no ESD protection is necessary. This provides a substantial advantage in terms of device cost and reliability, in that electrical contact must not be effected in order to assure communication between the battery pack or the battery charger.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable battery pack, comprising:

at least one battery cell;

a wireless communication means for communicating with a battery charging device wherein said wireless communication means is a magnetically coupled (BPSK) bit phase shift keying protocol signal; and a memory device coupled to said wireless communication means, said memory device containing information relating to recharging said at least one battery cell.

2. A rechargeable battery pack as defined in claim 1, wherein said memory device contains charging instructions describing a recharging process for said at least one battery cell.

3. A rechargeable battery pack as defined in claim 1, wherein said wireless communication means provides information transfer from said battery to said battery charging device.

4. A rechargeable battery pack as defined in claim 1, wherein said wireless communication means can both transmit information to, and receive information from said battery charging device.

5. A rechargeable battery pack as defined in claim 1, wherein said memory means includes a microprocessor having a memory, at least a portion of which is non-volatile.

6. A rechargeable battery pack as in claim 1, wherein said wireless communication means comprises a battery circuit responsive to a magnetic flux signal produced by said battery charging device, said battery circuit capable of affecting said magnetic flux signal.

7. A rechargeable battery pack as in claim 6, wherein said battery circuit comprises:

a tank circuit for coupling with said magnetic flux signal and providing a sinusoidal signal having a phase; and a phase shift means coupled to said tank circuit for shifting said phase of said sinusoidal signal.

8. A rechargeable battery pack as in claim 7, wherein said phase shift means comprises a resistor and a logic gate having an output, said resistor coupled between said tank circuit, and said output of said logic gate, said logic gate switching said resistor in and out of parallel, with said tank circuit in response to said memory means.

9. A rechargeable battery pack as in claim 8, wherein said logic gate is an exclusive or logic gate.

10. A battery charging system, comprising:

a rechargeable battery pack having at least one battery cell, a memory device storing information relating to recharging said at least one battery cell stored therein, and wireless communication module responsive to a magnetic flux for transmitting information stored in said memory device; and a battery charging device for recharging said battery, said battery charging device having a controller, a variable power source responsive to said controller, an excitation circuit providing a magnetic flux signal to said wireless communication module, and a reader circuit for receiving information from said wireless communication module.

11. A battery charging system as in claim 10, wherein said information relating to recharging said at least one rechargeable cell comprises instruction for recharging said rechargeable battery cell.

12. A battery charging system as in claim 10, wherein said wireless communication module comprises a coil and a capacitor coupled in parallel forming a tank circuit, said tank circuit providing a sinusoidal signal.

13. A battery charging system as in claim 12, wherein said wireless communication module further comprises a phase shift means coupled in parallel with said tank circuit and responsive to said memory device, said phase shift means shifting the phase of said sinusoidal signal in response to said memory device.

14. A battery charging system as in claim 10, wherein said exaltation circuit comprises a coil and a capacitor coupled in parallel forming a tank circuit, said coil providing said magnetic flux signal.

15. A battery charging system as in claim 10, wherein said reader circuit comprises:

a tank circuit responsive to said magnetic flux signal and of said magnetic flux signal phase errors; and a phase shift detection means for detecting said phase errors of said magnetic flux signal phase errors and producing a digital output.

* * * * *